JASPER N. HIERONYMUS.
Improvement in Bee Hives.
No. 121,618.                                   Patented Dec. 5, 1871.
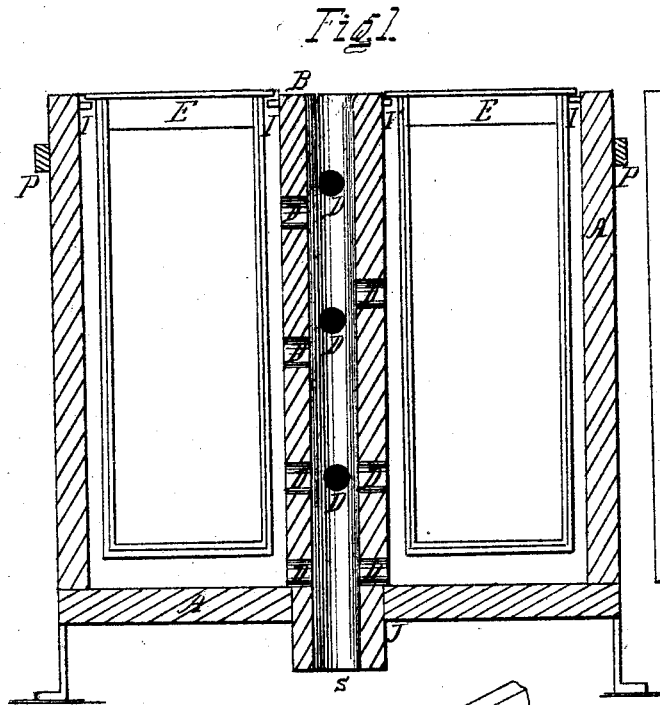
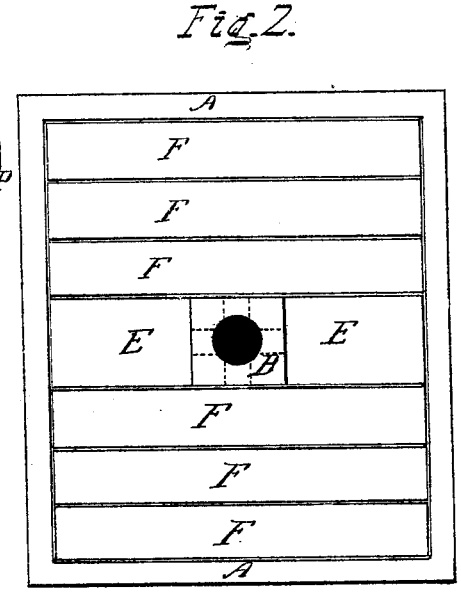
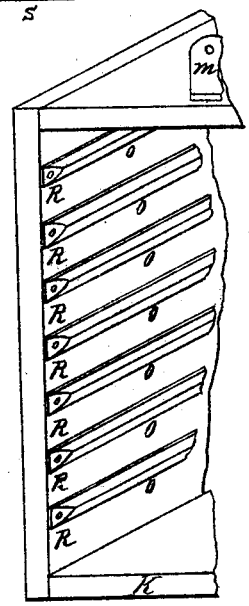
Witnesses.
J. F. Kiff
John Corner
Inventor.
Jasper N. Hieronymus

No. 121,618

UNITED STATES PATENT OFFICE.

JASPER N. HIERONYMUS, OF FAIRBURY, ILLINOIS.

IMPROVEMENT IN BEE-HIVES.

Specification forming part of Letters Patent No. 121,618, dated December 5, 1871.

*To all whom it may concern:*

Be it known that I, JASPER N. HIERONYMUS, of Fairbury, in the county of Livingston and State of Illinois, have invented a certain Improvement in Bee-Hives, of which the following is a specification:

My invention relates to the introduction of a center column in such a manner that said center column shall be capable of giving to the bees greater facilities for entrance to any desired portion of the hive; also of effectually carrying off all bee moisture, securing to bees more honey in less time with less travel; also, giving the most direct route to honey-cap above, the bees being enabled to keep out all moth or bee-intruders by guarding inward entrances.

Figure 1 is a side representation of a hive embodying my invention. Fig. 2 is a representation of top of same by end view. Fig. 3 is inside view of honey-cap.

A is a box, which should be made about square, as in Fig. 2, leaving out one end-board for the reception of movable frames. In the bottom board of hive in the center should be made a square mortise, J, the size proper for center column B, which is made by boring lengthwise through a square piece of timber, as represented in Fig. 1, it being one-half sectional view. Main entrance C, commencing at S; bees' entrance continues up to B; also have inner entrances or communication holes D, being adapted to direct communication to honey-cap above without interfering with honey in main hive A. Also, that they have inner entrance direct; E E, as in Fig. 1, being two small movable frames placed on opposite sides of center column B, and rest on bearings I formed by driving into hive A small finishing-nails; E E, in Fig. 2, being top view of same; F being large ones placed in full width, resting upon bearings at each end similar to I; P P, side cleats on hive A, used in lifting. Column B should be tenoned but little where it enters mortise J; K, as represented in Fig. 3, being one-half sectional view of honey-cap; being made triangular in shape similar to roof of house, the width and length corresponding with size of hive A, and secured by hooks on each end; M being small slide over glass; o, rafters inserted, temporarily secured at foot R by small nails, being adapted to easy removal of honey. The whole structure rests upon four iron stays or legs secured on side of hive A at bottom.

I claim as my invention—

The center column B, provided with the lateral openings D, and arranged between the frames E E of the hive A, substantially as set forth, for the purpose specified.

JASPER N. HIERONYMUS.

Witnesses:
   T. F. KIFF,
   JOHN COOMER.        (9)